United States Patent Office 2,884,153
Patented Apr. 28, 1959

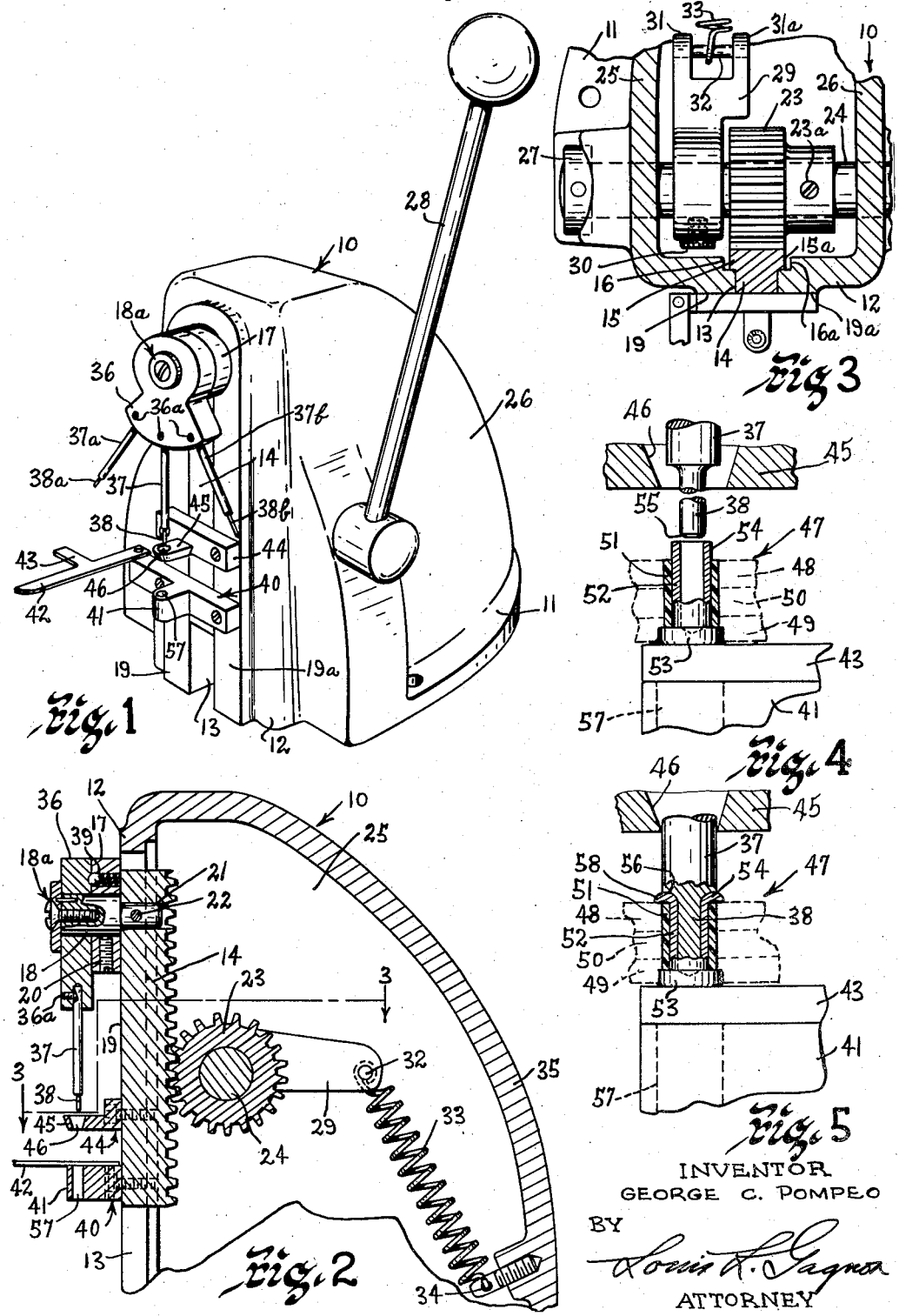

2,884,153

OPHTHALMIC TOOL DEVICES

George C. Pompeo, Putnam, Conn., assignor to American Optical Company, Southbridge, Mass., a voluntary association of Massachusetts Application April 27, 1954, Serial No. 425,902

1 Claim. (Cl. 218—14)

This invention relates to improvements in devices for use in assembling the parts of an ophthalmic mounting and has particular reference to the provision of an improved device for uniting parts having connection openings therein such as the temples and endpieces of such mountings.

In the manufacture and dispensing of ophthalmic mountings, it has been a common practice to make the fronts and the temples of such mountings separately of each other and to different given sizes. These fronts are provided with endpieces having perforated ears and the temples are also provided with perforated ears. They are stocked by dispensers for pivotal connection with each other in accordance with the requirements of different individuals.

In pivotally connecting the temples with the endpieces considerable difficulty has been encountered, in the past, in having the pivotal means work loose and become disconnected and lost or in having the parts become worn to the extent that the temples become loose and wobbly and do not properly support the lenses before the eyes. It is desirable, therefore, that the pivotal connection be such as to relatively permanently retain the temples and endpieces in proper frictional relation with each other and also to avoid having the pivotal means become detached and lost.

With a view to attaining the above, there has recently been developed a pivotal member for use with temples and endpieces which comprises a headed metallic hollow bushing having a sleeve of nylon or other suitable wear-resisting material thereon. This is inserted as a pivotal unit in the aligned openings in the temple and endpiece ears with the hollow metallic bushing being thereafter expanded to set up and retain a desired frictional tension between the nylon sleeve and the walls of the aligned openings and with the said bushing being simultaneously flared at its free end to permanently anchor the unit in said aligned openings.

While this type of pivotal connection has proven quite satisfactory, it has presented a problem in providing a device for expanding the bushing and securing the unit in the alinged openings and which may further be used to remove the unit if desired.

It, therefore, is one of the primary objects of this invention to provide a device which is simple in its operation and positive in its function for accomplishing the above results of expanding the bushing the desired amount and of simultaneously flaring the end of said metallic bushing in such a manner as to cause the parts to be permanently held in frictional assembled pivotal relation with each other.

Another object is to provide a device of the above character which embodies a support or anvil upon which is adapted to be located the temple hinge portion of an ophthalmic mounting, which temple hinge portion includes interfitting ears having aligned openings in which is positioned a pivotal unit comprising a headed bushing having a sleeve of nylon or the like thereon, the device also embodying a plunger movable toward and away from the anvil and having an expansion member adapted to slide into the bushing for expanding it to cause compression of the sleeve whereby the sleeve will frictionally engage the adjacent portions of the hinge ears, and further embodying means for flaring the exposed end of the bushing whereby said flared end and the head thereof at the opposed end of the bushing will function to retain the pivotal unit in desired assembled relation with the adjacent portions of the hinge.

Another object is to provide a device of the above character embodying means for expanding the bushing substantially uniformly throughout the area thereof which effectively compresses the sleeve, whereby substantially uniform pressure of the sleeve upon all the ears of the hinge is provided.

Another object is to provide a device of the above character which embodies hand-controlled rack and pinion means for controlled movement of an expansion member into the bushing to be expanded, and spring means for automatically returning the expansion member to normal inoperative position upon release of the rack and pinion means.

Another object is to provide a device of the above character which embodies a plurality of expansion members each of a different length for selective use in expanding bushings of varying lengths.

A further object is to provide means in a device of the above character for causing a bushing to become easily and automatically disengaged from an expansion member after an expanding operation has been performed.

A still further object is to provide such a device which is adapted for use in ejecting bushings from bearings of the above character.

Other objects and advantages of this invention will become apparent from the following description taken in connection with the accompanying drawings, in which:

Fig. 1 is a perspective view of a device embodying the preferred form of the invention;

Fig. 2 is a vertical sectional view taken substantially through the center of the device shown in Fig. 1;

Fig. 3 is a fragmentary horizontal sectional view taken substantially on line 3—3 of Fig. 2 looking in the direction of the arrows;

Fig. 4 is an enlarged fragmentary view partly in section illustrating an expansion member about to enter a bushing during an expansion operation; and Fig. 5 is a view generally similar to Fig. 4 showing the relative positions of an expansion member and bushing during an expansion operation at a point immediately prior to withdrawal of the expansion member from the expanded bushing.

Referring more particularly to the drawings wherein like characters of reference designate like parts throughout the several views, the preferred embodiment of the invention comprises a hollow metal housing 10 which is preferably arranged to be secured to a bench or table as by a flange 11 which is bolted or otherwise clamped to the bench to hold the device steady during use.

The front wall 12 of the housing 10 is formed with a vertical slot 13 in which a toothed rack 14 is disposed for slidable movement longitudinally of the slot 13. The rack 14 is provided on each side with longitudinal flanges 15—15a (Fig. 3), the flanges 15—15a being adapted to be located in respective grooves 16—16a formed in the inner side of the wall 12 adjacent the slot 13. The rack 14 is held in this position by a spacer collar 17 (Figs. 1 and 2) which is carried by a stud 18 in overlying relation with the outer surface of a pair of tracks 19—19a which are formed on the outer side of the wall 12 adjacent and extending longitudinally of the slot 13. The collar 17 is immovably secured directly to the stud 18 as by a set screw 20, and the stud 18 has a portion 21 of reduced diameter which extends into the rack 14, the rack 14 being connected thereto as by a pin 22. The collar 17, therefore, holds the rack 14 securely in place while permitting vertical movement of said rack within slot 13, the collar 17 riding along the surfaces of tracks 19—19a as the rack 14 is moved.

Means for moving the rack 14 comprises a co-operating pinion 23 which is secured as by a set screw 23a to a shaft 24 journaled in the opposed side walls 25—26 of the housing 10, the ends of the shaft 24 extending through the respective walls with one end thereof having a collar 27 (Fig. 3) pinned thereon to prevent longitudinal displacement of the shaft 24 in one direction and the other end having an upwardly extending handle 28 (Fig. 1) secured thereto. By pulling the handle 28 forwardly and downwardly, the shaft 24 and pinion 23 can be made to rotate to cause resultant downward movement of the rack 14.

Also mounted on shaft 24 within the housing 10 is an arm 29, one end of which is secured as by a set screw 30 to the shaft 24 for rotation therewith. The other end of the arm 29 is bifurcated as shown at 31—31a in Fig. 3, with the bifurcations 31—31a being connected by a pin 32 to which is attached one end of a coil spring 33. The spring 33 extends downwardly from the arm 29 and the other end thereof is connected as by a stud or pin 34 to the rear wall 35 of the housing 10. Thus, when the handle 28 is pulled to move the rack 14 downwardly in slot 13, such movement results in an upward swinging movement of the arm 29 against the inherent tension of the spring 33. However, upon release of the handle 28, the spring will function to return the arm 29 to its normal inoperative position, causing the pinion 23 to move the rack 14 upwardly.

On the outer end of the stud 18, which is connected to the rack 14, is a plunger-carrying indexing head 36. The indexing head 36 is held in place on the stud 18 and against the outer surface of collar 17 by a screw and washer arrangement 18a (Fig. 2) whereby the head 36 will be permitted to rotate on stud 18. Fixedly secured in the lower end of the head 36, as by set screws 36a, and extending radially therefrom are a plurality of plungers 37—37a—37b. The plungers 37—37a—37b are in predetermined spaced relation with one another and are shown in Fig. 1 as being three in number, all shaped substantially like spindles each having a relatively short pin-like expansion member at its free end, the expansion members being indicated respectively by numerals 38—38a—38b.

The plungers 37—37a—37b are adapted to be selectively located in position of use by manual rotation of the head 36 to the position where the selected plunger is substantially aligned vertically and parallel with the rack 14. Thus, as shown in Fig. 1, plunger 37 is in position of use. A spring detent device 39 in the collar 17 is adapted to engage respective recesses in the adjacent surface of the head 36 to aid in accurately positioning a selected plunger in position of use. When handle 28 is pulled, plunger 37 will move downwardly toward a fixed anvil 40 which is screwed, bolted or otherwise fastened to the tracks 19—19a in spanning relation to the slot 13. The fixed anvil 40 is provided with a forwardly extending portion 41 which is adapted to underlie and interrupt the downward movement of the selected plunger 37.

Pivotally attached to one end of the fixed anvil 40 is a plate 42 which is shaped to substantially the shape of the upper side of the fixed anvil 40 and has a portion 43 adapted to overlie the anvil portion 41.

Above the anvil 40 and spaced therefrom is a block 44 which is likewise secured to the tracks 19—19a, and which is provided with a forwardly extending stripper plate 45 which has an aperture 46 therein for guiding the selected plunger during its downward movement.

In using the device the selected plunger, plunger 37 for example, is located in position of use by rotating the head 36 to the required position. Then, with the plate 42 swung into overlying relation with the fixed anvil 40, a partially assembled hinge 47 with the pivotal unit therein (Fig. 4) is placed on the fixed anvil.

It is particularly pointed out here that the plungers 37—37a—37b are substantially identical except for the fact that the expansion members are of different lengths and are selected for use in accordance with the particular type of hinge to be assembled; that is, so-called three-barrel, five-barrel, or other types of hinges may be used wherein the overall thicknesses of the hinge ears are different. Therefore, the plunger must be selected to have an expansion member of the desired length.

The hinge 47 being assembled is shown in Figs. 4 and 5 as being a three-barrel hinge embodying two spaced overlying ears 48 and 49 which are provided, for example, on a temple of an ophthalmic mounting, and a third ear 50 located between ears 48—49, ear 50 being provided on the endpiece of the mounting and being adapted to pivot with respect to ears 48—49 on a pivot unit comprising a tubular-shaped sleeve 51 formed of nylon or the like. The sleeve 51 extends through ears 48 and 50 and partially through ear 49. A tubular-shaped bushing 52 formed of an expandable metal is located inside the sleeve 51 and has on its lower end a head 53 which is located within a recess in ear 49. The sleeve 51 is of a length to extend substantially from the exposed surface of ear 48 to the inner surface of the head 53. The bushing 52 is of an outside diameter only sufficiently smaller than the inside diameter of the sleeve 51 to permit insertion therein, but is of a length to have a portion 54 extending somewhat beyond the surface of ear 48, as shown in Fig. 4. The inside diameter of the bushing 52, however, is substantially smaller than the diameter of the expansion member 38, the exact dimensions being scientifically computed so that when the expansion member 38 is forced into the bushing 52, it will expand the bushing to the desired extent whereby the sleeve 51 will be compressed between the bushing 52 and the side walls of the openings in the ears 48—49—50 and will frictionally engage the said side walls with the desired amount of tension.

Thus, when the handle 28 is pulled to move the rack 14 downwardly, the selected plunger 37 will also move downwardly toward the hinge 47. The expansion member 38, which is tapered slightly at the end as indicated at 55 (Fig. 4), enters the interior of the bushing 38, guided by aperture 46 in stripper plate 45, and as its downward movement continues, it causes the bushing 52 to expand and compress the sleeve 51. The plunger 37, having been selected in accordance with the particular hinge 47 being assembled, will have an expansion member 38 of a controlled length and diameter such that the tubular body portion of the bushing 52 will be expanded a substantially uniform extent throughout its length.

Simultaneously with the expansion operation, the protruding portion 54 of the bushing 52 is flared outwardly and rounded smoothly, as shown in Fig. 5, to enclose the exposed end of the sleeve 51 and to slightly overlie the annular portion of the adjacent surface of ear 48 encircling the aperture therein, which thus prevents accidental withdrawal of the bushing 52. Such flaring and rounding procedure is accomplished by the annular end portion 56 of the plunger 37 at the junction thereof with the protruding expansion member 38. The annular end portion 56 is curved upwardly and outwardly throughout so that as it engages the end portion 54 of bushing 52, it will cause the portion to flare outwardly as desired. Continued downward movement will cause the flared portion 54 to become firmly pressed over the end of the sleeve 51 and into engagement with the surface of ear 48. In this way, this way, no rough unsightly edges will be exposed and the bushing 52 and sleeve 51 will be retained in position. After the handle 28 has been pulled firmly forward to expand and flare the bushing 52, it is released and the spring 33 functions as described to move the plunger 37 upwardly. However, due to the tight fit of the expansion member 38 with the inner walls of the bushing 52, such upward movement of the plunger 37 will lift the hinge 47 off the plate 42. The hinge 47 will, however, only rise slightly since it will engage the underside of the forwardly extending stripper plate 45. Since further upward movement of the hinge 45 thus is prevented, the expansion member 38 will be easily withdrawn from the bushing 52 as the plunger 37 continues its unhindered upward movement back to normal inoperative position.

Means is also provided for ejecting a bushing 52 from an assembled hinge 47. To accomplish this, the plate 42 on fixed anvil 40 is swung outwardly, as shown in Fig. 1, to uncover an opening 57 in the protruding portion 41 of the anvil 40. The assembled hinge 47 from which the bushing is to be removed is then placed directly on the fixed anvil 40 with the bushing aligned with the opening 57. Then by pulling handle 28, an operator will cause a selected plunger 37, 37a or 37b to engage the bushing 52 and force it downwardly out of the hinge 47 and through the opening 57. The outer annular edge portions 58 of the end 54 of the bushing 52 will break away during such an operation and thus the bushing 52 will slide easily out of the hinge 47. It is apparent that should the bushing 52 remain on the expansion member of the selected plunger, it can easily be removed therefrom by any suitable means; or by tilting the hinge slightly to misalign the openings therein with respect to the longitudinal axis of the expansion member. This will cause the hinge itself to provide an abutment to urge the bushing 52 off the expansion member 38 when the plunger is returned to normal inoperative position by release of handle 28.

From the foregoing description, it is apparent that novel means have been provided for mechanically securing pivotal units in hinges in accordance with the objects and advantages of this invention.

While the novel features of the invention have been shown and described and are pointed out in the annexed claim, it is to be understood that various omissions, substitutions and changes in the construction and arrangement of parts shown and described may be made by those skilled in the art without departing from the spirit of the invention. Therefore, it is to be understood that all matter shown or described is to be interpreted as illustrative and not in a limiting sense.

I claim:

A device for use in expanding the rivets of a temple hinge connection or the like wherein the rivets have shanks to extend through aligned openings in the hinge ears or temples and endpieces of an ophthalmic mounting, said device comprising the combination of an anvil member and a thin elongated expansion member, one of which is movable toward and away from the other along a predetermined longitudinal axis of movement, guide means fixedly supported on said device in predetermined close spaced relation with said anvil member, said guide means having a tapered opening therein whose longitudinal axis is aligned with said predetermined axis and is in perpendicular relation with the plane of the upper surface of the anvil, said tapered opening on the side of the guide means opposite said anvil being of a size greater than the cross-sectional size of said expansion member to initially loosely receive said expansion member and on the side of the guide means facing said anvil member being of a size to completely surround and intimately receive and support said expansion member in alignment with said predetermined axis and against sidewise deflection during its movement in directions along said predetermined axis toward said anvil member when one of said members is moved toward the other, the tapered side walls of said opening being such that if said expansion member is initially slightly out of line with said predetermined axis it will guide said expansion member through the side of the opening facing the anvil member and align the same with said predetermined axis, said expansion member having its end toward said anvil member terminating in an end part of reduced diameter, the size of the opening on the side of said guide means facing said anvil member being such that the wall surrounding said opening will further serve to strip said rivet from the tapered end part of the expansion member when said end part is retracted through the opening in said guide member after the expansion of the rivet shank.

References Cited in the file of this patent

UNITED STATES PATENTS

| | | |
|---|---|---|
| 265,016 | Campbell | Sept. 26, 1882 |
| 284,054 | Palmer | Aug. 28, 1883 |
| 562,368 | Barry | June 23, 1896 |
| 1,319,413 | Osgood | Oct. 21, 1919 |
| 2,054,269 | Reilly | Sept. 15, 1936 |
| 2,187,647 | Double et al. | Jan. 16, 1940 |
| 2,562,724 | Lebert | July 31, 1951 |
| 2,612,281 | Erhardt | Sept. 30, 1952 |
| 2,618,400 | Imhof | Nov. 18, 1952 |
| 2,630,935 | Gookin | Mar. 10, 1953 |

FOREIGN PATENTS

| | | |
|---|---|---|
| 221,686 | Germany | May 2, 1910 |